March 22, 1955 P. KUPCHAK 2,704,405
PENDULUM LEVEL
Filed Feb. 4, 1954 3 Sheets-Sheet 1
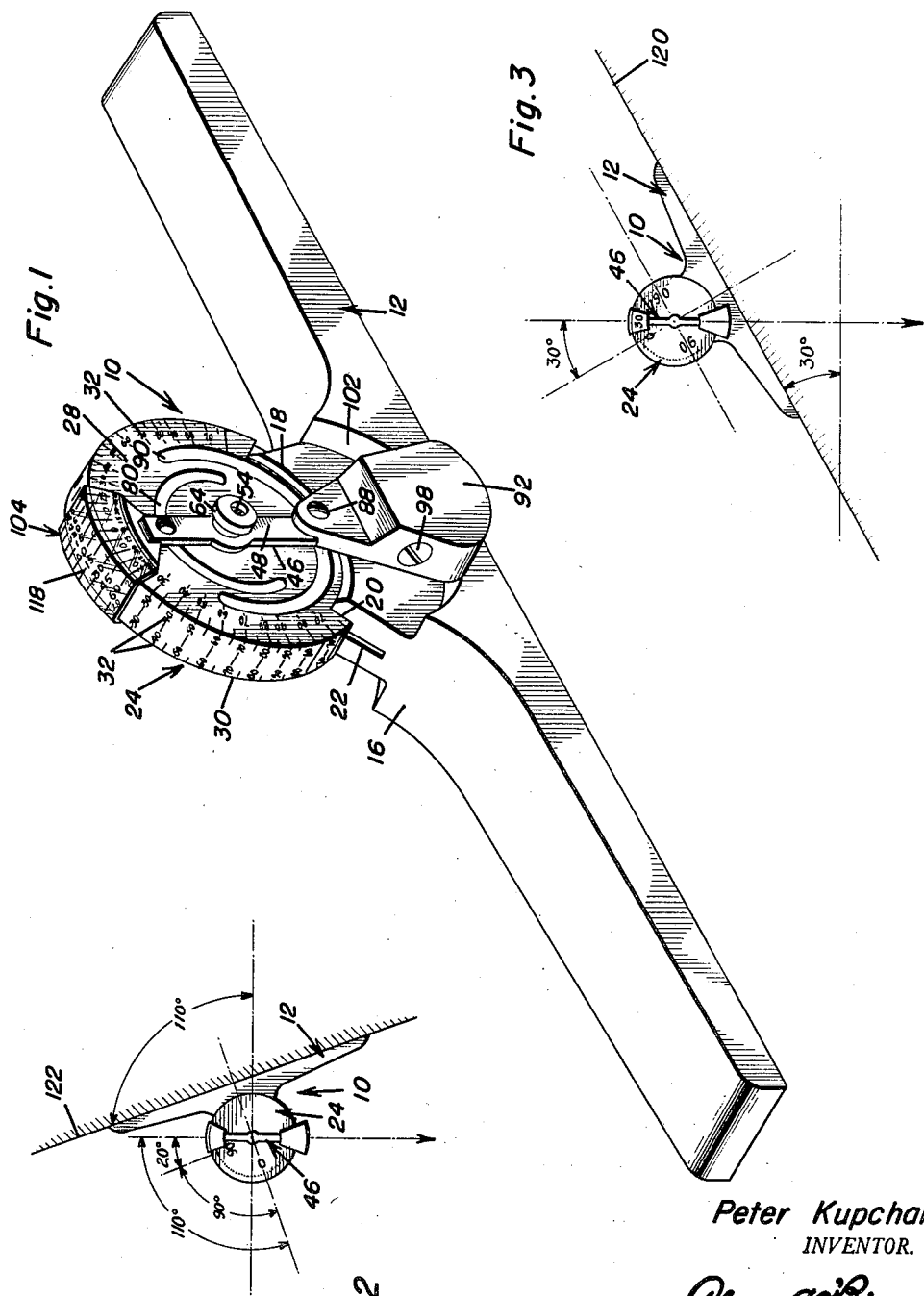
Peter Kupchak
INVENTOR.

March 22, 1955  P. KUPCHAK  2,704,405
PENDULUM LEVEL
Filed Feb. 4, 1954  3 Sheets-Sheet 2
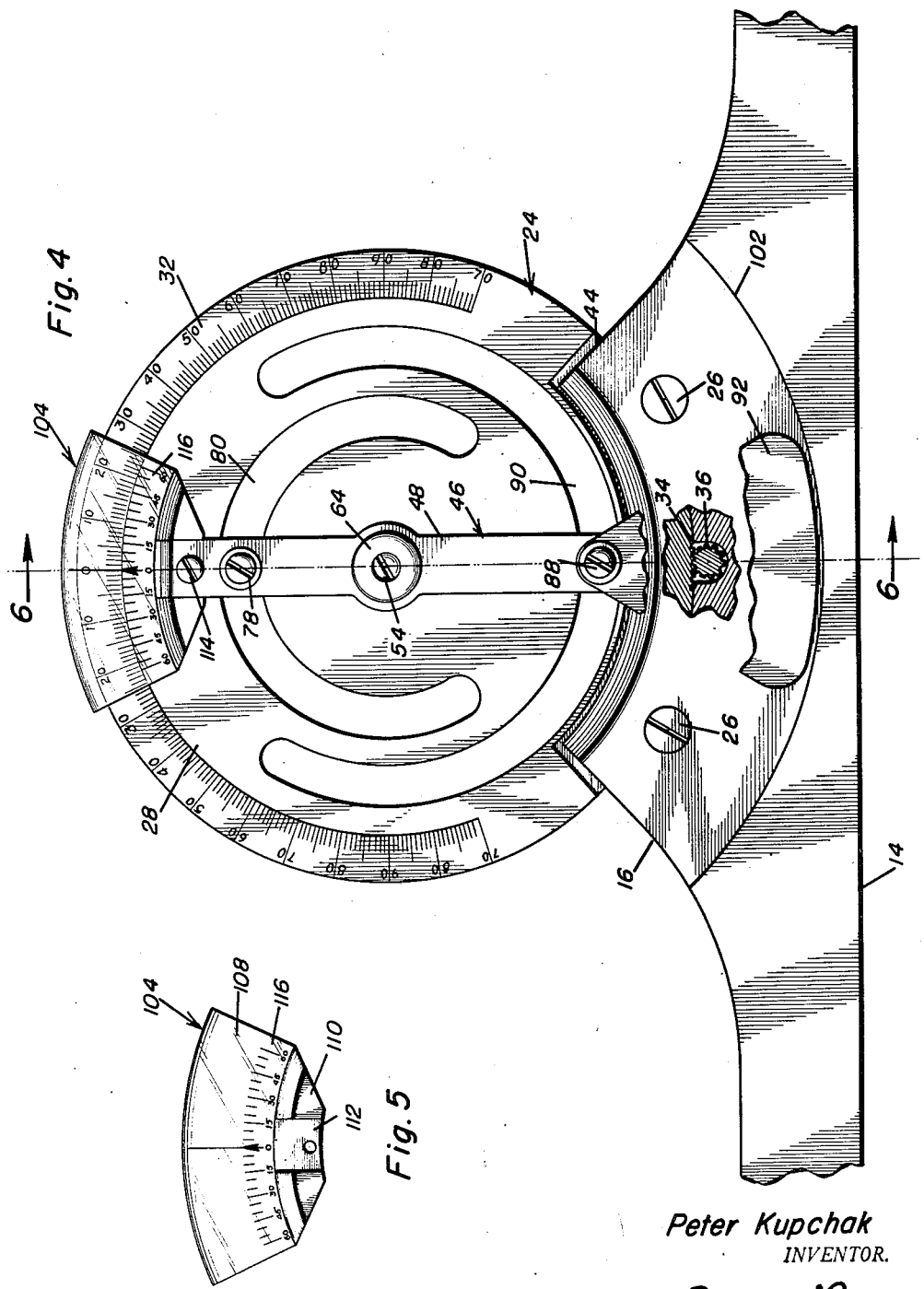
Peter Kupchak
INVENTOR.

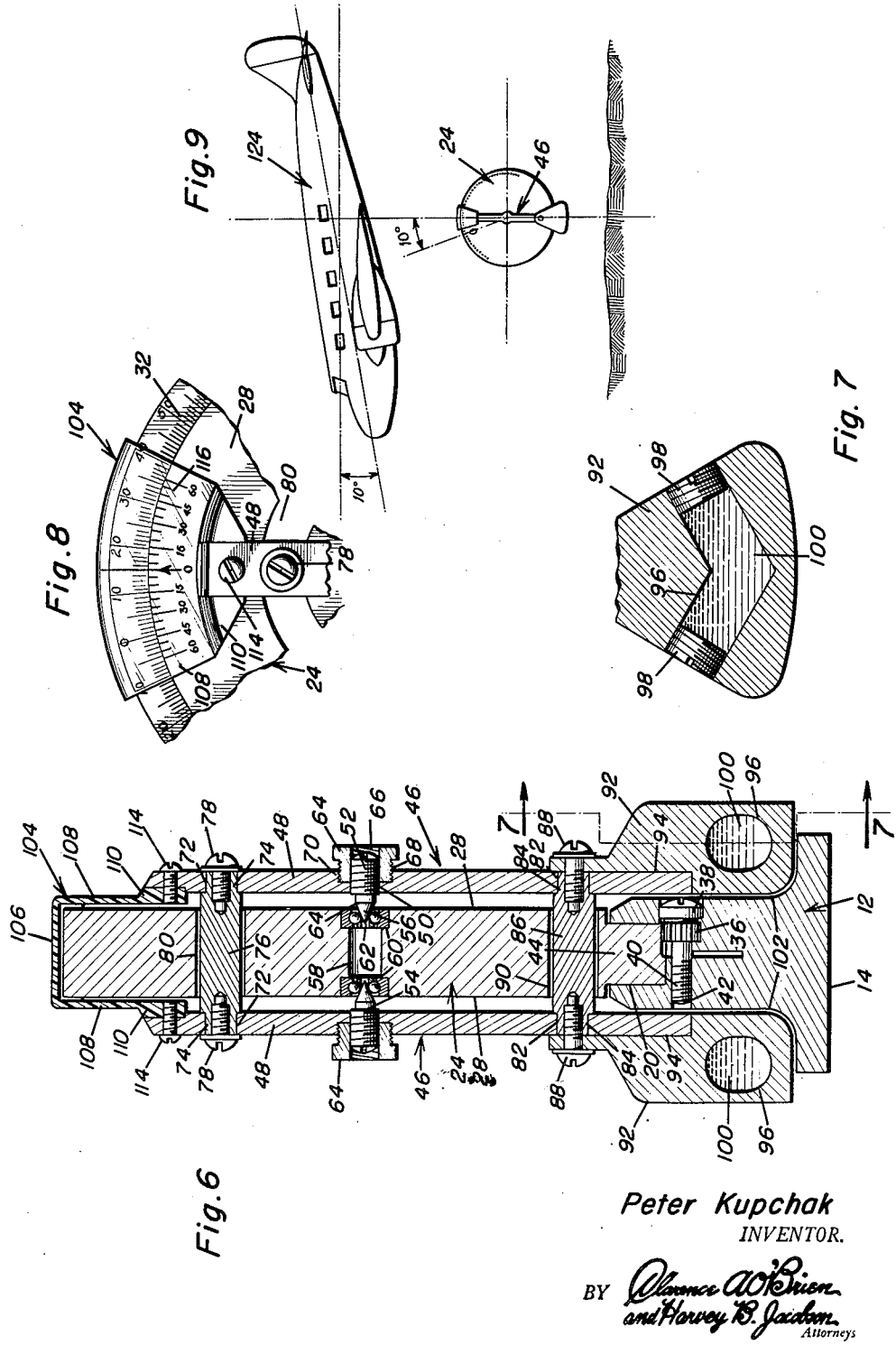

United States Patent Office 2,704,405
Patented Mar. 22, 1955

2,704,405

PENDULUM LEVEL

Peter Kupchak, Wheeling, W. Va., assignor of forty per cent to Vincent C. Szeligo, Wheeling, W. Va.

Application February 4, 1954, Serial No. 408,262

6 Claims. (Cl. 33—219)

This invention relates in general to improvements in instruments of the leveling type, and more specifically to an improved pendulum level.

It is a well known scientific fact that a member having a weight at one end and pivotally mounted will remain vertical with the weight at the lower end thereof, due to the force of gravity irrespective of the angle a support therefor is disposed to the horizontal. Utilizing this principle, it is the primary object of this invention to provide an improved pendulum level which utilizes a pair of levels so as to apply equal forces on pivots so that no eccentricity is set up to deter the action of the pendulum.

Another object of this invention is to provide an improved pendulum level which includes a base and a dial having mounted thereon a pendulum, there being provided cooperating means on the base and dial for selectively rotating the dial relative to the base to permit selective adjustment of the dial with respect to the base.

Another object of the invention is to provide an improved pendulum level which includes multiple face dial means and a multiple face pointer whereby the level may be read from any position.

A still further object of this invention is to provide an improved pendulum type level which may be utilized both for surveying purposes and in aircraft, the pendulum level being in the form of an instrument for checking conventional turn and bank indicators and the artificial horizon indicator, or may be utilized as a replacement.

A still further object of this invention is to provide an improved pendulum level which includes a pair of spaced pendulums to eliminate any eccentric forces on a pivot for the pendulums, the pendulums being provided with means for suitably varying the weights thereof so that the pendulums may be of identical weight.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the pendulum level which is the subject of this invention and shows the same in a horizontal position;

Figure 2 is an elevational view on a smaller scale showing the pendulum level being utilized to measure the angle of a surface with respect to the horizontal, the surface being disposed at an angle greater than 90 degrees to the horizontal;

Figure 3 is an elevational view similar to Figure 2 and shows the pendulum level of Figure 1 being utilized to measure the angle of a surface with respect to the horizontal, the surface being disposed at an angle less than 90 degrees with respect to the horizontal;

Figure 4 is an enlarged fragmentary elevational view of the pendulum level of Figure 1, portions thereof being broken away and shown in section in order to clearly illustrate the means for adjustably positioning the dial member with respect to the base;

Figure 5 is an enlarged elevational view of the cursor which cooperates with the indicia on the dial member for indicating the angle of the base with respect to the horizontal;

Figure 6 is an enlarged vertical sectional view taken substantially upon the plane indicated by the section line 6—6 of Figure 4 and shows the general construction of the pendulum level;

Figure 7 is an enlarged fragmentary vertical sectional view taken substantially upon the plane indicated by the section line 7—7 of Figure 6 and shows the manner in which the over-all weight of one of the weights may be selectively varied;

Figure 8 is an enlarged fragmentary elevational view of the upper portion of the dial member and shows the manner in which a reading may be made to the nearest five minutes; and Figure 9 is a schematic diagram showing the manner in which the pendulum level may be utilized in combination with aircraft as an instrument thereof.

Referring now to the drawings in detail, it will be seen that the pendulum level, which is the subject of this invention, is referred to in general by the reference numeral 10. The pendulum level 10 includes a base which is referred to in general by the reference numeral 12. The base 12 is relatively elongated and includes a planar bottom surface 14. The upper side of the base 12 is generally in spaced parallel relation with respect to the bottom surface 14 and projects upwardly at the center of the base 12 to form a suitable mount 16.

The mount 16 includes an arcuate upper surface 18 in which is formed an arcuate rabbet 20, the rabbet 20 being generally rectangular in cross section. Communicating with the rabbet 20 and opening downwardly into the mount 16 is an elongated arcuate slot 22.

The pendulum level 10 also includes a circular dial member 24 which is in the form of a relatively flat disc. The dial member 24 is of the same width as the rabbet 20 and has the bottom portion thereof seated therein. The dial member 24 is adjustably secured in the rabbet 20 by a pair of clamping screws 26. The clamping screws 26 join together the portions of the mount on opposite sides of the slot and rabbet 20 to tightly clamp the dial member 24 in an adjusted position.

The dial member 24 includes opposite faces 28 and a peripheral edge surface 30. Carried by the opposite faces 28 and the peripheral edge surface 30 are identical indicia 32. The indicia 32 are in the form of lines and numerals indicating various angles, the angles increasing from the zero mark in both a clockwise and counterclockwise direction and the zero mark being disposed at the extreme top of the dial member 24. For the pendulum level 10 to function properly, it is necessary that the line extending through the zero mark and the center of the dial member 24 be disposed at right angles to the plane of the bottom surface 14.

In order that the dial member 24 may be selectively positioned with respect to the base 12, the lower part of the peripheral surface 30 is provided with a segmental rack 34. The segmental rack 34 is intermeshed with a pinion 36. As is best illustrated in Figure 6, the pinion 36 is part of a screw 38 which has a threaded end portion 40 thereof threadedly engaged in an internally threaded bore 42 passing through the center portion of the mount 16. It will be seen that by slightly turning the screw 38, the reduced lower portions 44 of the dial member 24 seated in the rabbet 20 may be rotated relative to the mount 16 to facilitate positioning of the dial member 24.

Disposed on opposite sides of the dial member 24 and carried thereby are identical pendulum members which are referred to in general by reference numeral 46. Each of the pendulum members 46 includes an elongated leg 48. The leg 48 is provided at an intermediate point thereon with an internally threaded bore 50 which extends transversely therethrough. Adjustably secured in the internally threaded bore 50 is a screw portion 52 of a supporting pin 54 which includes a tapered end 56.

Formed at the exact center of the dial member 24 is a transverse bore 58 therethrough. The transverse bore 58 is provided at its opposite ends with counter bores 60. Mounted in the counter bores 60 are suitable bearings 62 which receive the pointed ends 56 of the pins 54.

In order that the pins 54 may be locked in adjusted positions, there is provided a lock screw 64 for each of the pins 54. Each lock screw 64 is internally threaded as at 66 and is threadedly engaged on the screw portion 52 of its associated pin 54. Each lock screw 54 is externally threaded as at 68 and is threadedly engaged in an internally threaded counter bore 70 for each of the bores 50.

The legs 48 are provided adjacent their upper ends with aligned bores 72 in which are seated reduced end portions 74 of a transversely extending pin 76. The legs 48 are removably secured to the pin 76 by removable fasteners 78. The pin 76 passes through an arcuate slot 80 formed in the dial member 24 and opening through the opposite faces 28 thereof.

The lower portions of the legs 48 are provided with transversely aligned bores 82. The bores 82 have seated therein reduced end portions 84 of a transversely extending pin 86. The pin 86 has the same effective length as the pin 76 and the legs 48 are removably secured thereto by suitable fasteners 88. It will thus be seen that the pins 86 and 76 retain the legs 48 in spaced parallel relation so that they may rotate in unison. The pin 86 passes through an arcuate slot 90 formed in the dial member 24 and opening through the opposite faces 28 thereof. As is best illustrated in Figure 4, the arcuate slots 80 and 90 are disposed generally concentric of each other.

Each pendulum 46 also includes a weight 92 at the lower end of each leg 48. The weight 92 is in the form of a block having a rabbet 94 in which the lower part of an associated leg 48 is seated. The weight 92 is secured to its associated leg by one of the fasteners 88.

Referring now to Figures 6 and 7 in particular, it will be seen that the effective weight of each of the weights 92 may be varied due to the provision of a V-shaped cross sectional passage 96 formed therethrough. The passage 96 has the ends thereof closed by threaded plugs 98 and is filled with a heavy substance, preferably mercury 100.

Referring now to Figures 1 and 4 in particular, it will be seen that the weights 92 have portions thereof disposed in the general plane of the central portion of the base 12. In order to permit free limited movement of the weights 92 when the pendulums 46 pivot, the central portion of the base 12 is provided with a pair of arcuate outline rabbets 102. It will be noted that the rabbets 102 conform generally to the outlines of the weights 92.

The pendulum level 10 also includes pointer means in the form of a cursor which is referred to in general by the reference numeral 104. The cursor 104 is channel shaped in cross section and includes a web 106 and depending flanges 108. The flanges 108 are provided at their lower ends with enlargements 110 which have formed therein vertically extending recesses 112. Seated in the recesses 112 and removably secured to the flanges 108 by fasteners 114 are upper ends of the legs 48.

The cursor 104 is formed of a transparent material and has formed on the surfaces of the flanges 108 thereof indicia 116. Also, the web 106 is provided with indicia 118. As best illustrated in Figure 4, the indicia 116 are disposed concentric of and inwardly of the indicia 32 on an associated one of the faces 28. It will be understood that the indicia 116 are of a vernier type and they cooperate with the indicia 32 to permit the reading of an angle to the nearest one-half minute. Inasmuch as the vernier type indicia are old and well known in other types of instruments, it is not believed necessary to elaborate further.

As is best illustrated in Figure 1, the indica 32 on the peripheral edge surface 30 project in the form of a pair of spaced angle indicating indicia and the indicia 118 on the cursor 104 are centrally located so that they may be compared with both of the rows of indicia 32. It will be understood that the relationship of the indicia 32 and 118 is the same as that described above with respect to the indicia 32 and 116.

Referring now to Figure 3 in particular, it will be seen that when the pendulum level 10 has the base 12 thereof mounted on a sloping surface, such as the surface 120, the pendulums 46 remain in vertical positions due to the force of gravity thereon. However, the dial member 24 has rotated to an angle equal to the angle which the surface 120 is disposed to the horizontal. This angle may be read in the manner indicated above.

Referring now to Figure 2 in particular, it will be seen that there is illustrated a surface 122 which is disposed at an angle to the horizontal greater than 90 degrees. If it is desired to measure this angle, the base 12 of the pendulum level 10 is positioned on the surface 122 in the same manner as indicated above relative to the surface 120. The pendulums 46 again remain in vertical positions due to the force of gravity thereon while the dial member 24 rotates with the base 12. Inasmuch as the indicia 32 increase from zero to 90 and then begin to decrease again, it is necessary to subtract the actual reading from 90 degrees and add the difference to 90 degrees. This corrected reading will be the angle at which the surface 122 is disposed with respect to the horizontal.

Referring now to Figure 9 in particular, it will be seen that the pendulum level, which is the subject of this invention, may be mounted in an aircraft, such as the aircraft 124. When rigidly mounted in the aircraft 124, there will be no necessity for the particular base 12 inasmuch as a similar part of the aircraft 124 may function as the base for the dial member 24. Inasmuch as the pendulums 46 will remain vertical under all conditions, it will be seen that the angle of inclination to the horizontal on the aircraft 124 may be conveniently measured through the use of the dial member 24 and the pendulums 46. When the instruments are mounted in the aircraft 124 in a longitudinally extending plane, they will function as an artificial horizon indicator and if mounted in a vertical plane extending transversely of the aircraft, will form a turn and bank indicator.

It will be understood that the instruments, for example in the form illustrated in Figure 1, may be temporarily mounted in an aircraft, such as the aircraft 124 for the purpose of checking the existing instruments thereof. To accomplish this, it is merely necessary to mount the base 12 in a fixed horizontal position. Then by carefully checking the instruments of the aircraft 124 with the readings on the dial member 24, the accuracy of the instruments may be determined.

It will be understood that the pendulum level 10 may be utilized either for checking the angle of a surface to the horizontal or for positioning a surface at a desired angle to the horizontal. It will be understood that the pendulum level 10 may be utilized at any cases where the ordinary bevel level is now utilized and that the same will be more accurate inasmuch as the guess work required with a bevel level is eliminated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A pendulum level comprising an elongated base, said base having a planar bottom surface, a circular dial member carried at the upper side of said base, a pendulum pivotally carried by said dial member, indicia on said dial member, pointer means on said pendulum cooperating with said dial member to indicate the angle of said bottom surface relative to the horizontal, cooperating means carried by said base and said dial member for selectively rotating said dial member to position same relative to said base, said indicia being on opposite faces of said dial member, said pointer means being in the form of a transparent cursor, said cursor being channel shaped and cooperating with said opposite faces.

2. A pendulum level comprising an elongated base, said base having a planar bottom surface, a circular dial member carried at the upper side of said base, a pendulum pivotally carried by said dial member, indicia on said dial member, pointer means on said pendulum cooperating with said dial member to indicate the angle of said bottom surface relative to the horizontal, cooperating means carried by said base and said dial member for selectively rotating said dial member to position same relative to said base, said indicia being on opposite faces and a peripheral edge of said dial member, said pointer means being in the form of a transparent cursor, said cursor being channel shaped and cooperating with said opposite faces and peripheral edge.

3. A pendulum level comprising an elongated base, a circular dial member carried at the upper side of said base, arms pivotally secured to said dial member at opposite faces thereof, equal weights carried at the lower ends of said arms, pointer means connecting together upper ends of said arms, indicia on said faces cooperating with said pointer means.

4. A pendulum level comprising an elongated base, a circular dial member carried at the upper side of said base, arms pivotally secured to said dial member at opposite faces thereof, equal weights carried at the lower ends of said arms, pointer means connecting together upper ends of said arms, indicia on said faces cooperating with said pointer means, said pointer means being in the form of an inverted channel shaped transparent cursor.

5. A pendulum level comprising an elongated base, a circular dial member carried at the upper side of said base, arms pivotally secured to said dial member at opposite faces thereof, equal weights carried at the lower ends of said arms, pointer means connecting together upper ends of said arms, indicia on said faces cooperating with said pointer means, means connecting together said legs adjacent ends thereof, said means extending through said dial member and movable in arcuate slots formed in said dial member and opening through said faces.

6. A pendulum level comprising an elongated base, a circular dial member carried at the upper side of said base, arms pivotally secured to said dial member at opposite faces thereof, equal weights carried at the lower ends of said arms, pointer means connecting together upper ends of said arms, indicia on said faces cooperating with said pointer means, means connecting together said legs adjacent ends thereof, said means extending through said dial member and movable in arcuate slots formed in said dial member and opening through said faces, the lowermost of the last mentioned means including a transverse pin and fasteners, said fasteners also securing said weights to said legs.

References Cited in the file of this patent

UNITED STATES PATENTS

| Number | Name | Date |
|---|---|---|
| 496,300 | Durand | Apr. 25, 1893 |
| 988,705 | Graham | Apr. 4, 1911 |
| 1,094,583 | Moonen | Apr. 28, 1914 |
| 1,290,685 | Townsley | Jan. 7, 1919 |
| 1,366,430 | Sperry | Jan. 25, 1921 |